T. KUNDTZ.
DOOR.
APPLICATION FILED APR. 22, 1912.

1,114,271.

Patented Oct. 20, 1914.

Witnesses:
H. T. Gittins
B. C. Brown

Inventor
Theodor Kundtz
By
Attorneys.

UNITED STATES PATENT OFFICE.

THEODOR KUNDTZ, OF CLEVELAND, OHIO.

DOOR.

1,114,271.   Specification of Letters Patent.   Patented Oct. 20, 1914.

Application filed April 22, 1912. Serial No. 692,354.

*To all whom it may concern:*

Be it known that I, THEODOR KUNDTZ, a citizen of the United States of America, residing at Cleveland, in the county of Cuyahoga and State of Ohio, have invented certain new and useful Improvements in Doors; and I hereby declare the following to be a full, clear, and exact description of the invention, such as will enable others skilled in the art to which it appertains to make and use the same.

This invention relates to improvements in doors, and more especially to a door adapted for use on an automobile or vehicle and comprising a wooden frame reinforced and protected at the forward edge of its lock-stile by a metal bar and having its outer side formed by a metal plate independent of said bar.

One object is to render the component parts of the door capable of being manufactured and assembled with facility.

Another object is to reinforce and protect the forward edge of the aforesaid stile by a metal bar formed independently of the plate instrumental in forming the outer side of the door, and to have a portion of said bar adapted to abut against a door-stop upon slamming the door shut.

Another object is to prevent strain during the slamming of the door into its closed position on said plate and on the devices employed in securing said bar to said stile.

With these objects in view, this invention consists in certain features of construction, and combinations and arrangement of parts, hereinafter described, pointed out in the claim, and illustrated in the accompanying drawings.

Figure 1:
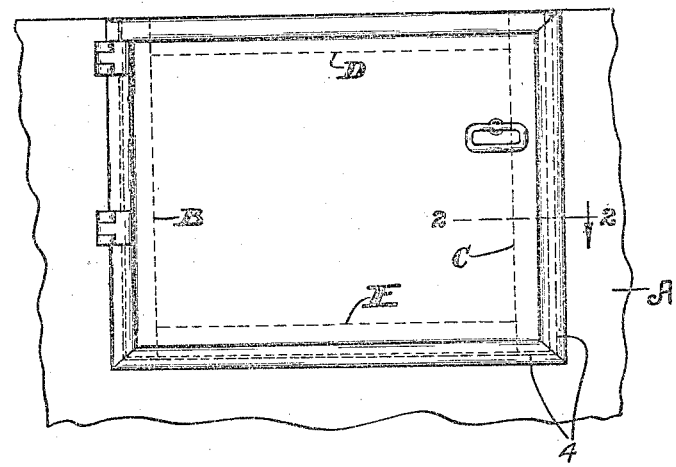
Figure 2:
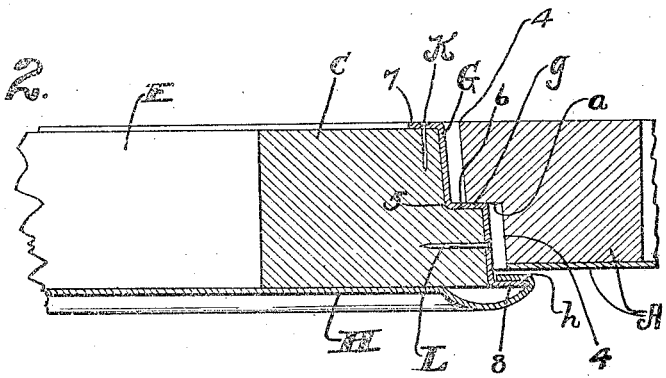

In said drawings, Figure 1 is a side view of a portion of an automobile or vehicle provided with a door embodying my invention. Fig. 2 is a horizontal section on line 2—2, Fig. 1. Fig. 2 is drawn on a larger scale than Fig. 1.

Referring to the drawings, A indicates the body of an automobile or vehicle provided with a lateral aperture or doorway 4 for receiving my improved door which comprises a wooden frame which, as shown in dotted lines Fig. 1, is composed of a hanging stile B, a lock-stile C and two rails D and E extending between the two stiles. The stile C is shown in solid lines in Fig. 2. The stile C is provided at its forward edge and inner side with a rabbet 5 which has one wall 6 thereof facing in the direction of the inner side of the door and arranged centrally between the inner and outer sides of the door. The stile C is reinforced and protected at its forward edge by a metal bar G which abuts against and extends transversely of or covers said edge, as shown in Fig. 2, and has a central portion *g* abutting against or overlapping the wall 6 of the rabbet 5 and forming a shoulder which faces in the direction of the inner side of the door and is adapted in slamming the door shut to slam against a stop-forming shoulder *a* formed on the body A at one side of the doorway 4 centrally between the inner and outer sides of said body, which shoulder faces in the direction of the outer side of said body and is arranged to be overlapped by the aforesaid portion *g* of the bar G in the closed position of the door.

The bar G is provided at the inner side of the stile C with an inner flange 7 which abuts against or overlaps the inner side of said stile. The bar G is provided at the outer side of the stile C with an outer flange 8 which projects forwardly of the forward edge of the stile C and is arranged substantially flush at its outer side with the outer side of said stile. The outer side of the door is formed by a metal plate H which covers the outer side of the stile C and the outer side of the outer flange 8 of the bar C and is flanged, as at *h*, over the inner side of said flange of said bar.

The bar G is secured to the stile C by nails or securing devices K and L. In Fig. 2 a nail K is shown extending from within the flange 7 into the stile C, and another nail L is shown extending into said stile from within said bar between the rabbet 5 and the outer side of said stile. In the closed position of the door the portion *g* of the bar G is in contact with the shoulder *a* on the body A, but the flange *h* is spaced from the outer side of said body in said position of the door so that the finish of the exterior of said body is not injured or marred by said flange in slamming the door shut. The application of a lock and hinges to the door and the attachment of the door to the body A are too well known in the art to require description in this specification.

It will be observed that by my improved construction the relative arrangement of the parts is such that the door does not abut against the outer side of the body A in the closed position of the door, but that the bar G is adapted to abut centrally between its flanges 7 and 8 against the door-stop a; that the flange 7 and the central portion g of the bar G effectively prevent strain on the nails or securing devices K and L in slamming the door shut, and that the bar G and the plate H are made and applied with facility. It will also be observed that the flange 7, overlapping the inner side of the door-frame, presents a smooth corner, and when upholstering or any covering (not shown) is applied to the inner side of the door, liability of said upholstering or covering becoming cut or worn, due to racking of said door when being slammed shut or when the vehicle is in motion, is prevented.

What I claim is:—

The combination, with a vehicle-body having a doorway and stop-forming means arranged between the outer and inner sides of said body, of a door engaging said doorway in its closed position and comprising a wooden frame which comprises a lock-stile provided with a metal bar which is secured to the forward edge of and reinforces and protects said stile, which bar is provided between the outer and inner sides of said stile with stop-forming means adapted to engage the stop-forming means on the body in the aforesaid position of the door, said bar having a flange which is arranged at the outer side of said stile and projects forwardly of the forward edge of said stile, the door also comprising a metal plate which forms the outer side of the door and has a portion thereof flanged over the inner side of the aforesaid flange, said flanged portion of said metal plate extending opposite but being spaced from the outer side of said body.

In testimony whereof, I sign the foregoing specification, in the presence of two witnesses.

THEODOR KUNDTZ

Witnesses:
B. C. BROWN,
H. L. McDONNELL.